(12) United States Patent
Ben Henda et al.

(10) Patent No.: US 10,613,189 B2
(45) Date of Patent: Apr. 7, 2020

(54) LOCATION INFORMATION BASED ON COUNTERS OF GRID CELLS

(71) Applicant: Telefonaktiebolaget LM Ericsson (publ), Stockholm (SE)

(72) Inventors: Noamen Ben Henda, Stockholm (SE); Fredrik Lindblom, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/318,467

(22) PCT Filed: Jun. 5, 2017

(86) PCT No.: PCT/EP2017/063612
§ 371 (c)(1),
(2) Date: Jan. 17, 2019

(87) PCT Pub. No.: WO2018/015062
PCT Pub. Date: Jan. 25, 2018

(65) Prior Publication Data
US 2019/0277938 A1 Sep. 12, 2019

Related U.S. Application Data

(60) Provisional application No. 62/363,371, filed on Jul. 18, 2016.

(51) Int. Cl.
*H04W 24/00* (2009.01)
*G01S 5/02* (2010.01)
*H04W 64/00* (2009.01)

(52) U.S. Cl.
CPC .......... *G01S 5/0236* (2013.01); *G01S 5/0284* (2013.01); *H04W 64/00* (2013.01); *H04W 64/003* (2013.01); *H04W 64/006* (2013.01)

(58) Field of Classification Search
CPC ............. H04W 64/006; H04W 64/003; H04W 5/0284; H04W 5/0236
(Continued)

(56) References Cited

U.S. PATENT DOCUMENTS 8,774,032 B2 7/2014 Vialen et al.
9,820,105 B2 11/2017 Snyder et al.
(Continued)

FOREIGN PATENT DOCUMENTS

RU 2013154418 A 6/2015
WO 2001017308 A1 3/2001

OTHER PUBLICATIONS

3RD Generation Partnership Project, "3rd Generation Partnership Project; Technical Specification Group Services and System Aspects; Study on Security issues to support Proximity Services (ProSe) (Release 13)", Technical Report, 3GPP TR 33.833 V1.7.0, Feb. 1, 2016, pp. 1-237, 3GPP, France.
(Continued)

*Primary Examiner* — Congvan Tran
(74) *Attorney, Agent, or Firm* — Coats & Bennett, PLLC

(57) ABSTRACT

A location information is based on a coordinate grid where different cell sizes could be supported in order to adapt to the accuracy of the available positioning system. The grid is divided into areas of fixed latitude width such that, within each area, and for a fixed minimal cell size, the variation of the geographical area covered by the cells is tolerated with respect to a certain parameter of the service parameter (e.g. the transmission range). Within each area the cells are numbered uniquely along the latitude lines by an x-counter and the longitude line by a y-counter. In order to transmit its location information, the sender uses a positioning method with a certain accuracy, decides on a cell size (among a fixed number of available fixed sizes), determines the x and y
(Continued)

counter of the cell where he is located and includes in the message an indication of the chosen cell size and equal numbers of LSBs for each of the counters.

16 Claims, 7 Drawing Sheets

(58) Field of Classification Search
USPC .............................. 455/404.2, 456.1, 456.3
See application file for complete search history.

(56) References Cited

U.S. PATENT DOCUMENTS

| | | | |
|---|---|---|---|
| 10,034,215 | B2 | 7/2018 | Zhang et al. |
| 2004/0142710 | A1 | 7/2004 | Liang |
| 2009/0022152 | A1 | 1/2009 | Henry et al. |
| 2010/0067604 | A1* | 3/2010 | Bhadra .................. H04B 7/024 375/267 |
| 2010/0273418 | A1* | 10/2010 | Eruchimovitch ..... G01S 5/0221 455/41.2 |
| 2013/0053023 | A1* | 2/2013 | Meredith .............. H04W 24/08 455/423 |
| 2013/0170383 | A1* | 7/2013 | Cho ...................... G01S 5/0242 370/252 |
| 2014/0031028 | A1 | 1/2014 | Yamada et al. |
| 2014/0056220 | A1 | 2/2014 | Poitau et al. |
| 2014/0146731 | A1 | 5/2014 | Hynell et al. |
| 2014/0162687 | A1 | 6/2014 | Edge |
| 2014/0244329 | A1 | 8/2014 | Urban |
| 2015/0042447 | A1 | 2/2015 | Vogt et al. |
| 2015/0271675 | A1 | 9/2015 | Cheng et al. |
| 2015/0339718 | A1 | 11/2015 | Walton et al. |
| 2016/0373971 | A1* | 12/2016 | Kulal ................... H04W 24/02 |
| 2017/0289154 | A1 | 10/2017 | Krieger et al. |
| 2019/0080353 | A1 | 3/2019 | Bleecher Snyder et al. |

OTHER PUBLICATIONS

3RD Generation Partnership Project, "3rd Generation Partnership Project; Technical Specification Group Services and System Aspects; Proximity-based services (ProSe); Stage 2 (Release 13)", Technical Specification, 3GPP TS 23.303 V13.4.0, Jun. 1, 2016, pp. 1-124, 3GPP, France.
3RD Generation Partnership Project, "3rd Generation Partnership Project; Technical Specification Group Services and System Aspects; Service requirements for the Evolved Packet System (EPS) (Release 13)", Technical Specification, 3GPP TS 22.278 V13.3.0, Jun. 1, 2016, pp. 1-46, 3GPP, France.
Qualcomm Incorporated, "On spatial replay of ProSe discovery messages for commercial discovery", 3GPP TSG SA WG3 (Security) Meeting #83, San Jose de los Cabos (Mexico), May 9, 2016, pp. 1-5, S3-160595, 3GPP.
Ericsson, "Sparial Replay Protection Mechanisms for ProSe Discovery", 3GPP TSG-SA WG3 Meeting #82, Dubrovnik, Croatia, Feb. 1, 2016, pp. 1-6, S3-160179, 3GPP.
Ericsson, "Solution for Key Issue #73.3 on spatial replay", 3GPP TSG-SA WG3 Meeting #84, Chennai, India, Jul. 25, 2016, pp. 1-7, S3-16abcd, 3GPP.

Lindblom, F. et al., "Spatial Replay Protection for Proximity Services", Degree Project in Information Technology, Second Levle, Aug. 10, 2016, pp. -97, retrieved from internet: http://kth.diva-portal.org/smash/record.jsf?pid=diva2:951652, KTH Royal Institute of Technology.
Ericsson, "Adding Key Issue on Spatial Replay for ProSe Discovery", 3GPP TSG-SA WG3 Meeting #82, Dubrovnik, Croatia, Feb. 1, 2016, pp. 1-4, S3-160162, 3GPP.
3rd Generation Partnership Project, "3rd Generation Partnership Project; Technical Specification Group Services and System Aspects; Study on Extended Architecture Support for Proximity-Based Services (Release 13)", Technical Report, 3GPP TR 23.713 V13.0.0, Sep. 1, 2015, pp. 1-80, 3GPP.
3rd Generation Partnership Project, "3rd Generation Partnership Project; Technical Specification Group Services and System Aspects; Network Identity and TimeZone (NITZ); Service Description; Stage 1 (Release 12)", Technical Specification, 3GPP TS 22.042 V12.0.0, Oct. 1, 2014, pp. 1-8, 3GPP.
3rd Generation Partnership Project, "3rd Generation Partnership Project; Technical Specification Group Services and System Aspects; Service Requirements for the Evolved Packet System (EPS) (Release 13)", Technical Specification, 3GPP TS 22.278 V12.1.0, Sep. 1, 2014, pp. 1-45, 3GPP.
3rd Generation Partnership Project, "3rd Generation Partnership Project; Technical Specification Group Services and System Aspects; Service Requirements for the Evolved Packet System (EPS) (Release 13)", Technical Specification, 3GPP Ts 22.278 V13.2.0, Dec. 1, 2014, pp. 1-46, 3GPP.
3rd Generation Partnership Project, "3rd Generation Partnership Project; Technical Specification Group Services and System Aspects; Proximity-Based Services (ProSe); Stage 2 (Release 12)", Technical Specification, 3GPP TS 23.303 V124.0, Mar. 1, 2015, pp. 1-63, 3GPP.
3rd Generation Partnership Project, "3rd Generation Partnership Project; Technical Specification Group Services and System Aspects; Proximity-Based Services (ProSe); Stage 2 (Release 13)", Technical Specification, 3GPP TS 23.303 V13.0.0, Jun. 1, 2015, pp. 1-97, 3GPP.
3rd Generation Partnership Project, "3rd Generation Partnership Project; Technical Specification Group Services and System Aspects; Proximity-Based Services (ProSe); Stage 2 (Release 13)", Technical Specification, 3GPP TS 23.303 V13.2.0, Dec. 1, 2015, pp. 1-122, 3GPP.
3rd Generation Partnership Project, "3rd Generation Partnership Project; Technical Specification Group Services and System Aspects; Proximity-Based Services (ProSe); Stage 2 (Release 13)", Technical Specification, 3GPP TS 23.303 V13.3.0, Mar. 1, 2016, pp. 1-124, 3GPP.
3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", Technical Specification, 3GPP TS 36.300 413.2.0, Dec. 1, 2015, pp. 1-290, 3GPP.
3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", Technical Specification, 3GPP TS 36.300 413.3.0, Mar. 1, 2016, pp. 1-295, 3GPP.

* cited by examiner

LOCATION INFORMATION BASED ON COUNTERS OF GRID CELLS

TECHNICAL FIELD

The invention relates to methods wherein information relating to a location of a mobile device is obtained. The invention also relates to computer programs, computer program products and mobile devices.

BACKGROUND

Location services are widely available and used. Many applications in a modern mobile phone can make use of the information relating to the location of the device in order to provide a for better user experience, for example by allowing data traffic offload, navigation, information about available nearby services, etc. In addition, this location information can usefully be shared with other devices.

Proximity Services (ProSe) is a new feature standardized by 3GPP providing services for ProSe-enabled UEs (User equipment) in proximity of each other. These features are standardized in 3GPP TS 22.278 (versions 13.3.0 published on 24 Jun. 2016) and TS 23.303 (version 13.4.0 published on 22 Jun. 2016). ProSe features include ProSe discovery and ProSe direct communication.

ProSe discovery is a process that allows ProSe-enabled UEs that are in proximity of each other to identify each other. ProSe direct communication enables the establishment of communication paths between ProSe-enabled UEs in direct communication range using E-UTRAN or WLAN.

This is a type of location service that is not directly based on the locations of the UEs, but rather is based on the ability of the UEs to detect each other's presence within the range of the service.

It has been proposed that ProSe discovery messages should include location information for security reasons. The transmitting device can generate the location information, and can then either include that location information explicitly in the communicated messages, or can use that location information in generating a Message Integrity Code (MIC) to be transmitted in the communicated messages. Several positioning systems have been standardized for LTE. Assisted GPS (A-GPS) is designated as the primary method while Enhanced Cell Identity (E-CID) and Observed Time Difference Of Arrival (OTDOA) are fall back ones. A-GPS requires a fix from 4 satellites which could be difficult in cities and indoor environments. OTDOA and E-CID are less accurate and require network coverage. Nevertheless, they work better where A-GPS fails and do not require as much power. WiFi positioning methods can also help indoors.

The inaccuracy levels of the methods above are in the worst case of the order of hundreds of metres (300 m). For Cell ID based methods, the inaccuracy varies up to the order of kilometres in rural areas. But because they are as power efficient as E-CID and OTDOA, these methods could also be used whenever such inaccuracy levels are tolerated.

However, such possible inaccuracies are often ignored when the device uses the location information.

In the context of Cellular Internet of Things (CIoT) applications such as in wireless sensors, there might be stringent requirements on power consumption so that the use of GPS sources is not possible as it incurs a huge drain on the device's battery. For the same reasons, processing overhead is to be minimized.

In the context of device to device, machine type communication, narrow band IoT (Internet of Things) or any other type of wireless communication where there are limited radio resources, including the location information might be considered as a waste of spectrum if its size is not negligible compared to the amount of data transferred.

For grid based approaches, other issues may arise related to the fact that the distance covered along the latitude lines, for a fixed longitude interval (e.g. 1 degree), depends on the latitude and basically decreases when moving from the equator towards the poles. As a consequence, the grid cells do not cover equally sized geographical areas.

There are other standardized grids where cells cover equally sized areas such as HEALPix. However, the resulting calculations related to coordinate conversion and cell identification are complex and will induce a considerable processing overhead.

3GPP discusses in 3GPP TR 33.833 V1.7.0 a security problem called the Spatial Replay for ProSe Direct Discovery. A spatial replay is caused by an attacker who listens to an air interface, collects discovery messages, and broadcasts them in a remote location which normally would be "out of range for ProSe". Thus UEs might discover each other and keep on communicating, believing that they are in proximity of each other even though they might be far from each other and even in different mobile networks.

SUMMARY

An object of the invention is to enable a solution which can contribute to at least a mitigation of a spatial replay attack.

According to an aspect of the invention, there is provided a method of operation of a mobile device. The method comprises: obtaining information relating to a location of the mobile device; determining a minimum cell size to be used; and, based on the determined minimum cell size, identifying a grid of cells. The method further comprises: based on the obtained information relating to the location of the mobile device, determining a cell of said grid in which the mobile device is located; identifying the cell of said grid in which the mobile device is located by means of respective counter values in each of two orthogonal directions; and transmitting location information, wherein the location information comprises a plurality of the least significant bits of each of said counter values.

According to an aspect of the invention, there is provided a mobile device configured to operate in accordance with the previous method.

According to an aspect of the invention, there is provided a mobile device comprising a processor and a memory. The memory contains instructions executable by the processor, such that the mobile device is operable to: obtain information relating to a location of the mobile device; determine a minimum cell size to be used; based on the determined minimum cell size, identify a grid of cells; based on the obtained information relating to the location of the mobile device, determine a cell of said grid in which the mobile device is located; identify the cell of said grid in which the mobile device is located by means of respective counter values in each of two orthogonal directions; and transmit location information, wherein the location information comprises a plurality of the least significant bits of each of said counter values.

According to an aspect of the invention, there is provided a mobile device comprising: an obtaining module for obtaining information relating to a location of the mobile device;

a determining module for determining a minimum cell size to be used; an identifying module for, based on the determined minimum cell size, identifying a grid of cells; a determining module for, based on the obtained information relating to the location of the mobile device, determining a cell of said grid in which the mobile device is located; an identifying module for identifying the cell of said grid in which the mobile device is located by means of respective counter values in each of two orthogonal directions; and a transmitting module for transmitting location information, wherein the location information comprises a plurality of the least significant bits of each of said counter values.

According to an aspect of the invention, there are provided a computer program configured, when run on a computer, to carry out the previous method, and a computer program product comprising a computer readable medium and such a computer program.

According to an aspect of the invention, there is provided a method of operation of a mobile device. The method comprises: obtaining information relating to a location of the mobile device; receiving transmitted location information relating to a location of another device, wherein the location information comprises a plurality of the least significant bits of respective counter values in each of two orthogonal directions; determining a minimum cell size used by the other device; based on the determined minimum cell size, identifying a grid of cells; and based on the received location information relating to the location of the other device, determining a cell of said grid in which the other mobile device is located.

According to an aspect of the invention, there is provided a mobile device, configured to operate in accordance with the previous method.

According to an aspect of the invention, there is provided a mobile device, comprising a processor and a memory. The memory contains instructions executable by the processor, such that the mobile device is operable to: obtain information relating to a location of the mobile device; receive transmitted location information relating to a location of another device, wherein the location information comprises a plurality of the least significant bits of respective counter values in each of two orthogonal directions; determine a minimum cell size used by the other device; based on the determined minimum cell size, identify a grid of cells; and based on the received location information relating to the location of the other device, determine a cell of said grid in which the other mobile device is located.

According to an aspect of the invention, there is provided a mobile device comprising: an obtaining module for obtaining information relating to a location of the mobile device; a receiving module for receiving transmitted location information relating to a location of another device, wherein the location information comprises a plurality of the least significant bits of respective counter values in each of two orthogonal directions; a determining module for determining a minimum cell size used by the other device; an identifying module for, based on the determined minimum cell size, identifying a grid of cells; and a determining module for, based on the received location information relating to the location of the other device, determining a cell of said grid in which the other mobile device is located.

According to an aspect of the invention, there are provided a computer program configured, when run on a computer, to carry out the previous method, and a computer program product comprising a computer readable medium and such a computer program.

Thus, the location information is transmitted in a form that requires limited spectrum usage.

DETAILED DESCRIPTION

Figure 1:
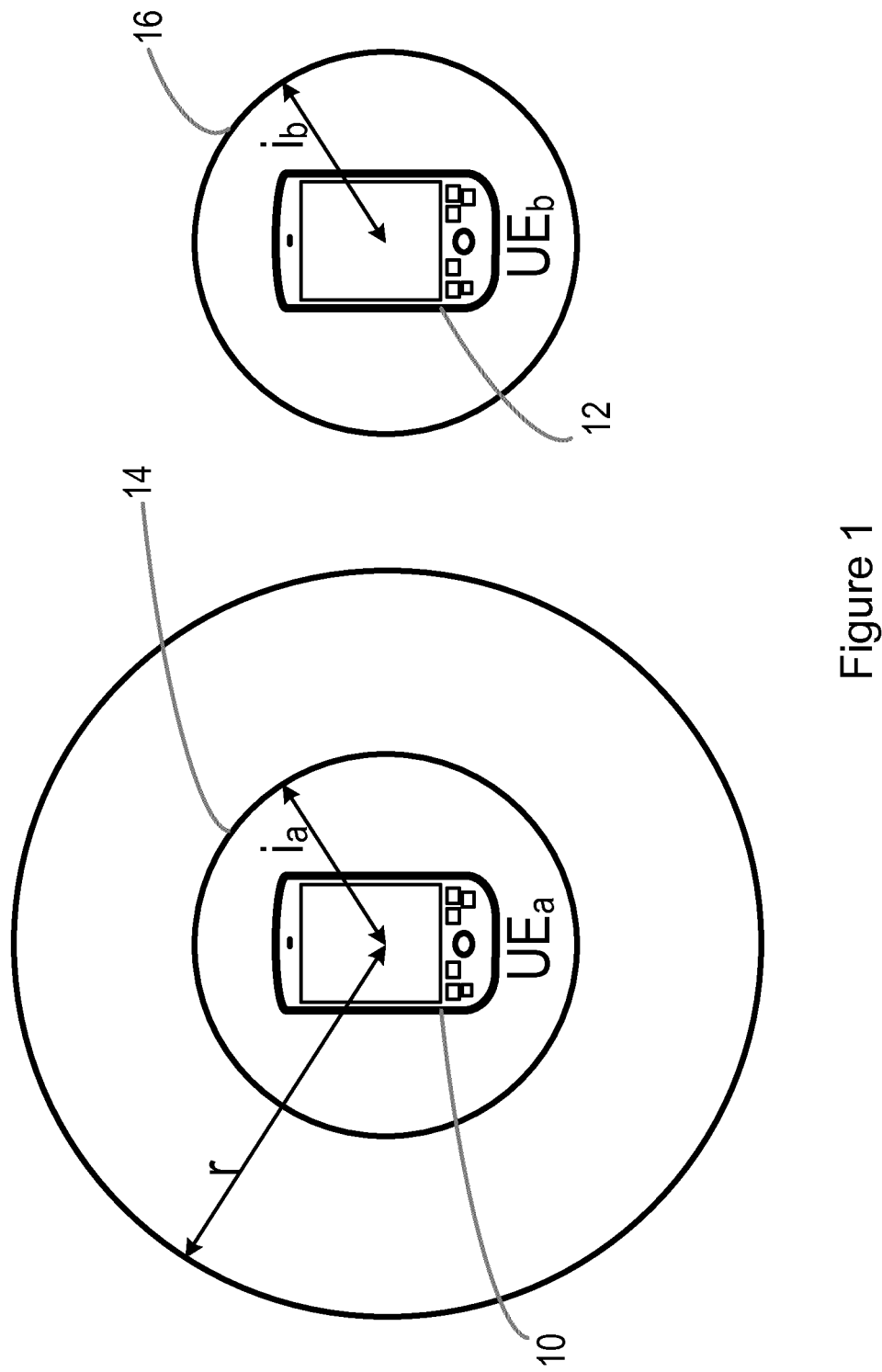
FIG. 1 illustrates devices involved in transmitting and receiving location information.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

The following detailed description relates to one particular example in which location services are used. Specifically the processes are described here with reference to the use of location services in the case of 3GPP Proximity Services (ProSe). However, it will be appreciated that the processes described here may be used in any application in which it is desired that a device should transmit information about its location, to be received by another device.

In this case, a mobile device transmits a discovery message, which can be detected by another mobile device that is within the service range. In order to reduce the possibility of replay attacks, in which an attacker detects a message transmitted by one mobile device and then replays that message at another location to cause a reply by another mobile device, the transmitting mobile device transmits information that is based on information identifying its location. The information that is based on the information identifying its location might be information that explicitly identifies the location, or might be information that is derived from the information identifying the location. For example, the information that is transmitted might be a Message Integrity Code (MIC) that is calculated using the information identifying the location. An alternative term for MIC is Message Authentication Code (MAC), which usually is used in security contexts, but sometimes causes confusion with Media Access Control.

The other mobile device then determines whether that information identifies a location that is within the expected service range of its own location. If it is not, then this implies that the message might be a replay attack.

In some cases, it can be estimated that the location service has a fixed range, denoted r. For example, in some versions of ProSe this range is about 500 m. The service is based on a message exchange taking place between at least two agents $UE_a$ and $UE_b$.

FIG. 1 shows a situation in which a first agent 10, referred to herein as $UE_a$, is transmitting a discovery message and a second agent 12, referred to herein as $UE_b$, receives the discovery message. If the range of the service is r, then the second agent $UE_b$ will need to be within this range of the first agent $UE_a$ in order to successfully receive the discovery message. However, it can also be noted that the two agents $UE_a$ and $UE_b$ will have access to positioning methods that will have respective inaccuracies denoted by $i_a$ and $i_b$ respectively. Thus, if FIG. 1 shows the actual position of the first agent $UE_a$, the location information that is obtained by $UE_a$ could indicate the location as being anywhere within the circle 14 having a radius of $i_a$. Similarly, if FIG. 1 shows the actual position of the second agent $UE_b$, the location information that is obtained by $UE_b$ could indicate the location as being anywhere within the circle 16 having a radius of $i_b$.

This possible inaccuracy can be accounted for when transmitting the location information.

In this example, the location information takes the form of information identifying a cell in a grid, and the cell size can be adapted based on information relating to the possible inaccuracy of the location information. That is, if it is known that the transmitting and receiving agents are using positioning systems that provide location information with high accuracy, then a small cell size can be used. However, if it is known or suspected that one or both of the transmitting and receiving agents are using positioning systems that provide location information with lower accuracy, it may be appropriate to use a larger cell size.

In the examples described herein, relating to a ProSe discovery message, it is not necessary to transmit sufficient information to fully identify the location of the transmitting device. Rather, it is only necessary to transmit sufficient information to allow the receiving device to determine the location of the transmitting device unambiguously, given that the receiving device knows its own location (with a certain possible inaccuracy), and given the knowledge that the transmitting device must be within the known range r of the receiving device.

In practice, in these examples, the cells of the grid are identified by respective counter values in two orthogonal directions, such as the latitudinal and longitudinal directions. Having identified the cell in which it is located, the transmitting device transmits only the least significant bits (LSBs) of the values that identify the cell in which it is located. In these examples, it is assumed that an equal number of LSBs is included from each counter value in the communication messages (although it will be appreciated that this is not necessarily the case), and that this number is denoted by b.

The cell size that is to be used can also advantageously take account of the number of least significant bits that are transmitted.

Figure 2:
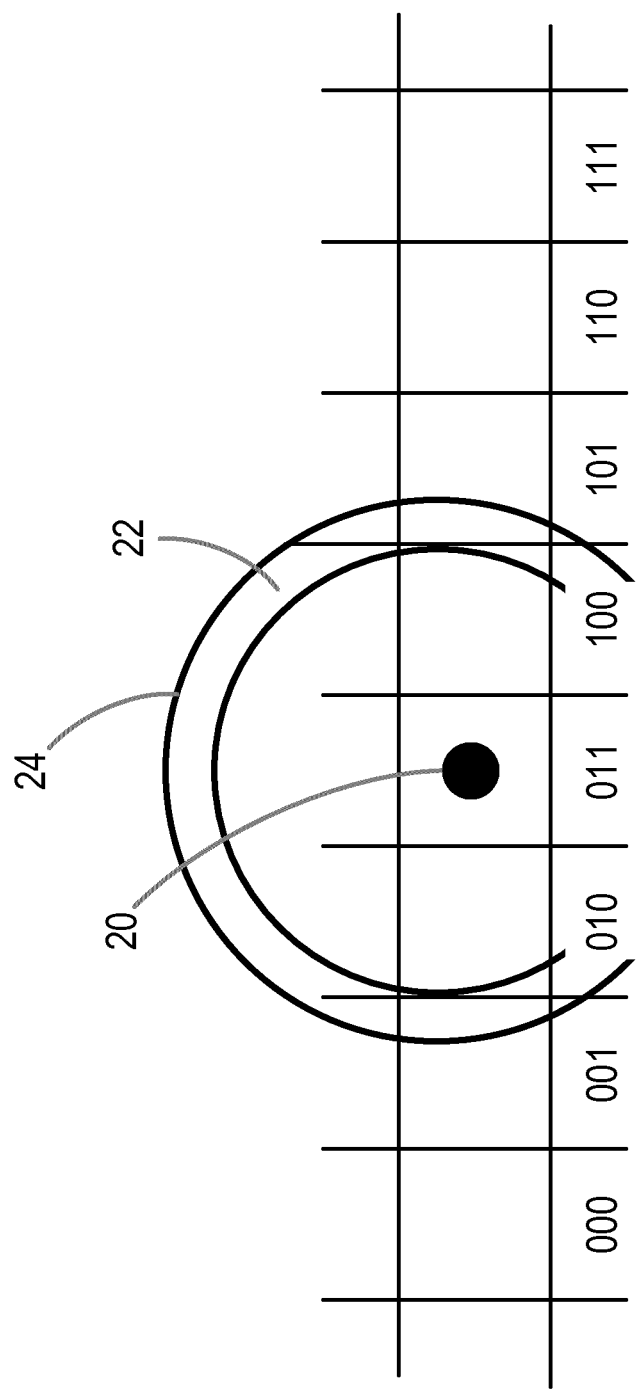
FIG. 2 illustrates a stage in a method.

This is illustrated in FIG. 2. FIG. 2 shows an example in which only the cells in the latitudinal direction are considered, although it will be appreciated that exactly the same considerations apply in the longitudinal direction. In this example, the three least significant bits of the latitudinal cell identifiers are shown, and so the three least significant bits of the eight cells indicated are 000, 001, 010, 011, 100, 101, 110, 111. This pattern then repeats over the whole grid.

FIG. 2 also shows a receiving device 20 in the cell which has 100 as the three least significant bits of its identifier. In this example, the position shown for the receiving device 20 is the position indicated by its location information. In fact, the receiving device may be anywhere within the range of inaccuracy $i_b$ of this point. The transmitting device is known to be within the service range r from the receiving device, but the location information obtained by the transmitting device may indicate a location anywhere within the range of inaccuracy $i_a$ from the actual location. Therefore, in the worst case, the location of the receiving device, as indicated by the potentially inaccurate location information, might be at a distance of $(r+i_a+i_b)$ from the location of the transmitting device, as indicated by the potentially inaccurate location information that it obtains.

If this distance $(r+i_a+i_b)$ is the radius of the circle 22 shown in FIG. 2, then, for the cell size illustrated in FIG. 2, it would only be necessary for the transmitting device to transmit the two least significant bits of its identifier, in order for the receiving device to be able to identify unambiguously the cell in which the transmitting device is located. With the location information of the receiving device indicating a location 20 at the centre of the cell, only the cells with the least significant bits 011, 100, 101 fall within the circle 22. Even if the location 20 were offset to the left or the right, only one of the cells with the indicators 010 and 110 would come within the circle 22. Therefore, these three or four cells can be uniquely identified by their two least significant bits.

However, if the distance $(r+i_a+i_b)$ is the radius of the larger circle 24 shown in FIG. 2, then, for the cell size illustrated in FIG. 2, it would be necessary for the transmitting device to transmit the three least significant bits of its identifier, in order for the receiving device to be able to identify unambiguously the cell in which the transmitting device is located. As shown in FIG. 2, the cells with the least significant bits 010, 011, 100, 101, 110 all fall within the circle 24. Therefore, it is necessary for the receiving device to receive the three least significant bits, in order to be sure that it will always be able to uniquely identify the cell in which the transmitting device was located.

It will be appreciated that the ambiguity can be resolved in an exactly equivalent manner, in the case where the distance $(r+i_a+i_b)$ is the radius of the larger circle 24, by using a larger cell size. Again, in that case, with larger cells, a smaller number of cells would fall within the circle, and a smaller number of least significant bits could be used to uniquely identify those cells.

Thus, in the embodiments described herein, the number of least significant bits that are used to identify the location of the transmitting device is kept constant, and the cell size is chosen such that this number of bits is sufficient for the receiver to uniquely identify the cell in which the transmitting device was located.

As mentioned above, these examples use cells that are generally square, and the cell size, that is the minimal width and height of any geographical area represented by a cell in the coordinate grid, is denoted by s.

The choice of the value for s could for example be based on the following formula, which also takes account of the possible inaccuracies and the range parameters discussed previously:

$(2^b-1)s > 2(r+i_a+i_b)$

Thus, the cell size is chosen such that the diameter of the circle (such as the circle 22 or 24 in FIG. 2) is less than the distance between the closest edges of any two cells that share the same b least significant bits. Thus, in the case illustrated in FIG. 2, where b=2, the pattern of the least significant bits repeats every 4 cells (because $2^2=4$), and so there are three cells between any two cells that share the same 2 least significant bits, and this corresponds to a distance of 3 s.

The mobile device may be provided with a fixed number of least significant bits that it is able to transmit. However, it may make a determination as to the values that should be used for the distances r, $i_a$, and $i_b$.

Thus, in some examples, a mobile device may determine what minimum cell size it wishes to use, in which case it may also transmit information that identifies this minimum cell size. For example, the mobile device may be configured with a small number of predetermined cell sizes, and it may determine which of these to use, and may then transmit information identifying the selected cell size.

In alternative examples, each mobile device mobile device may be configured with a predetermined cell size.

In these examples, each cell is of a generally square shape, although it will be appreciated that it is not possible to cover the surface of the earth with non-overlapping cells that are exactly square. In these examples, the length of one side of the square cells is taken to be the cell size.

The grid of cells is defined in a way that means that each cell in the grid is the same size, to a relatively high degree of accuracy.

Specifically, in this example, the surface of the earth surface is divided along lines of latitude into multiple bands. In this example, the bands have a fixed width of 3° of latitude. Then, one latitude value in each band is taken as a representative latitude for that band. In this example, the highest absolute latitude value in the band is taken as the representative value, denoted by $l_r$. Thus, for example, $l_r$ is taken to b e+57° for the band from 54° North to 57° North, and $l_r$ is taken to be −6° for the band from 3° South to 6° South.

The circumference of the earth is then determined at each of these representative latitudes.

This circumference is then divided by the minimum cell size that was determined previously, and the result gives the number of cells into which the circumference of the earth is divided throughout the band to which that representative latitude applies. Because the representative latitude is the latitude in the band at which the circumference of the earth is the smallest, this means that, when the larger circumference at a different latitude in the same band is divided into the same number of cells, the cells at that other latitude have a length in the latitudinal direction that is larger than the minimum size s.

Thus, for a minimum cell size s, the number of cells $n_y$ in the longitudinal direction (that is, along the y axis) and the number of cells $n_x$ in the latitudinal direction (that is, along the x axis) are given by the following formulas:

$$n_y = \left\lfloor \frac{c'}{2s} \right\rfloor \text{ and } n_x = \left\lfloor \frac{c\cos(l_r)}{s} \right\rfloor$$

where the constant c is used to denote the circumference of the earth at the equator, $l_r$ is the representative latitude for the band in which the device is located, as discussed above, and the constant c' is the average circumference of the earth along the longitude lines.

Thus, each cell has a side length of s in the longitudinal direction, and has a side length of s in the latitudinal direction if it is located at the representative latitude, or has a side length of slightly greater than s in the latitudinal direction if it is located away from the representative latitude.

One possibility is to decide in advance on an absolute minimal cell size value, and then to allow the transmitting device to adjust the minimum cell size that is to be adjusted, for example due to a worsening accuracy, by simply taking bigger cells with sizes that are multiple of the minimal cell size. This would simplify calculations.

The number along the y-axis could be fixed in advance if the value of s is known.

The cells in the grid are defined by latitude and longitude coordinates.

The grid cells are then numbered along the longitude lines (the y axis) from the south pole northwards and along the latitude lines (the x axis) from −180 degrees towards +180 degrees. Each cell is then uniquely identified with a combination of 2 numbers that are referred to herein as the x and y cell counters. It is the least significant bits of these counter values that form the location information that is transmitted by the transmitting device.

Thus, the latitude φ is used to determine the y counter of the current grid cell:

$$y = n_y \frac{\varphi + 90}{180}$$

As mentioned above, the latitude φ is also used to determine the band in which the device is located, and hence the area's corresponding reference latitude $l_r$.

The reference latitude $l_r$ is then used to calculate the number of grid cells in the x direction. The sender can then derive the x counter of the current cell from the longitude value θ:

$$x = n_x \frac{\theta + 180}{360}$$

With a fixed minimal cell size, the number of cells along the y axis is constant, since the distance covered by longitude lines is constant regardless of the longitude value itself. However, along the x axis, even with a fixed minimal cell size, the number of cells will depend on the latitude because the distance covered by a latitude line is not constant and depends on the latitude.

The chosen grid cell size could be agreed upon (standardized) or, as discussed above, it could be left open for the sender to choose among a finite fixed a set of possible sizes. In the latter case, it is then required that an indication of the chosen cell size is included in the message in addition to the least significant bits of the counter value of the cell.

In some embodiments, this location information can be restricted to only one byte of additional information, by allowing 2 bits for identifying the cell size and the remaining bits could be left for the LSBs. Tables 1 and 2 show two alternatives assuming that there are 3 possible fixed grid sizes.

In the example in Table 1, it is always the case that 3 LSBs are included in the message from each counter value regardless of the cell size and the sender accuracy. Thus, for example, the first two bits identify the chosen cell size, the second two bits carry the third least significant bits of the x and y counter values, the third two bits carry the second least significant bits of the x and y counter values, and the fourth two bits carry the least significant bits of the x and y counter values. This is lenient on the receiver, and may mean that, if the sender has access to a very accurate positioning method, then this will tolerate relatively higher inaccuracy on the receiver side.

TABLE 1

| Cell size | 2 bits | 2 bits | 2 bits | 2 bits |
|---|---|---|---|---|
| No info | 00 | 00 | 00 | 00 |
| Size 1 | 01 | LSBs | LSBs | LSBs |
| Size 2 | 10 | LSBs | LSBs | LSBs |
| Size 3 | 11 | LSBs | LSBs | LSBs |

In comparison to the previous alternative, the encoding in Table 2 is stricter. In this example, there may be 1, 2 or 3 LSBs from each counter value included in the message. Limiting the number of included LSBs means that the receiver is required to have better accuracy on his side. This means that the sender has a mechanism for preventing a receiver up to a certain level of inaccuracy from being able to recover the location information. The prefix that is used to indicate the cell size can then vary, depending on the number of included LSBs. Thus, if there are 3 LSBs are included in the message from each counter value, the first two bits identify the chosen cell size; if there are 2 LSBs are included in the message from each counter value, the first four bits identify the chosen cell size; and, if there is 1 LSB included in the message from each counter value, the first six bits identify the chosen cell size.

TABLE 2

| Cell size | 2 bits | 2 bits | 2 bits | 2 bits |
|---|---|---|---|---|
| No info | 00 | 00 | 00 | 00 |
| Size 1 | 01 | LSB | LSB | LSB |
| Size 2 | 10 | LSB | LSB | LSB |
| Size 1 | 11 | 00 | LSB | LSB |
| Size 2 | 11 | 01 | LSB | LSB |
| Size 3 | 11 | 10 | LSB | LSB |
| Size 1 | 11 | 11 | 00 | LSB |
| Size 2 | 11 | 11 | 01 | LSB |
| Size 3 | 11 | 11 | 10 | LSB |
| Size 4 | 11 | 11 | 11 | LSB |

Figure 3:
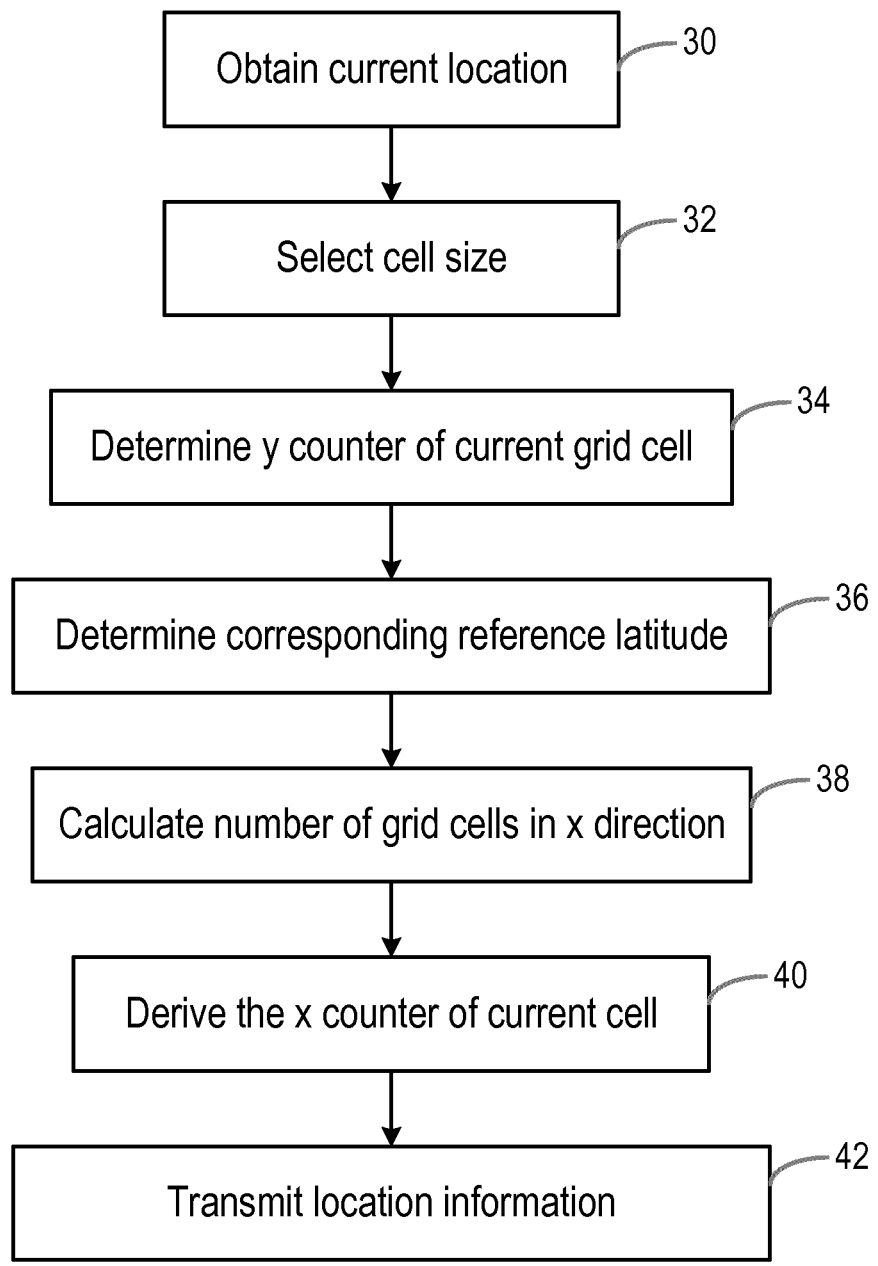
FIG. 3 is a flow chart illustrating a first method.

FIG. 3 is a flow chart, illustrating a method performed by the transmitting agent, in the case of an embodiment in which it is left to the sender to choose which cell size to use.

At step 30, the sender obtains its current location from a positioning method that meets the requirements of accuracy and, if possible with the method, confirms that the obtained location source actually provided sufficient accuracy.

At step 32, the sender determines which minimum cell size should be used. This can be determined based on information about the accuracy of its own positioning information, and based on information about the accuracy of the positioning system being used by the specific receiver to which the information is being transmitted.

At step 34, the sender uses its latitude φ is used to determine the y counter of the current grid cell:

$$y = n_y \frac{\varphi + 90}{180}$$

At step 36, the sender uses its latitude φ is used to determine the reference latitude for the band in which it is located.

The reference latitude is then used at step 38 to calculate the number of grid cells in the x direction.

At step 40, the sender can then use its longitude value θ to derive the x counter of the current cell:

$$x = n_x \frac{\theta + 180}{360}.$$

At step 42, the sender transmits the location information, which may comprise a plurality of the least significant bits of each of said counter values, and may further comprise information identifying the determined cell size.

Figure 4:
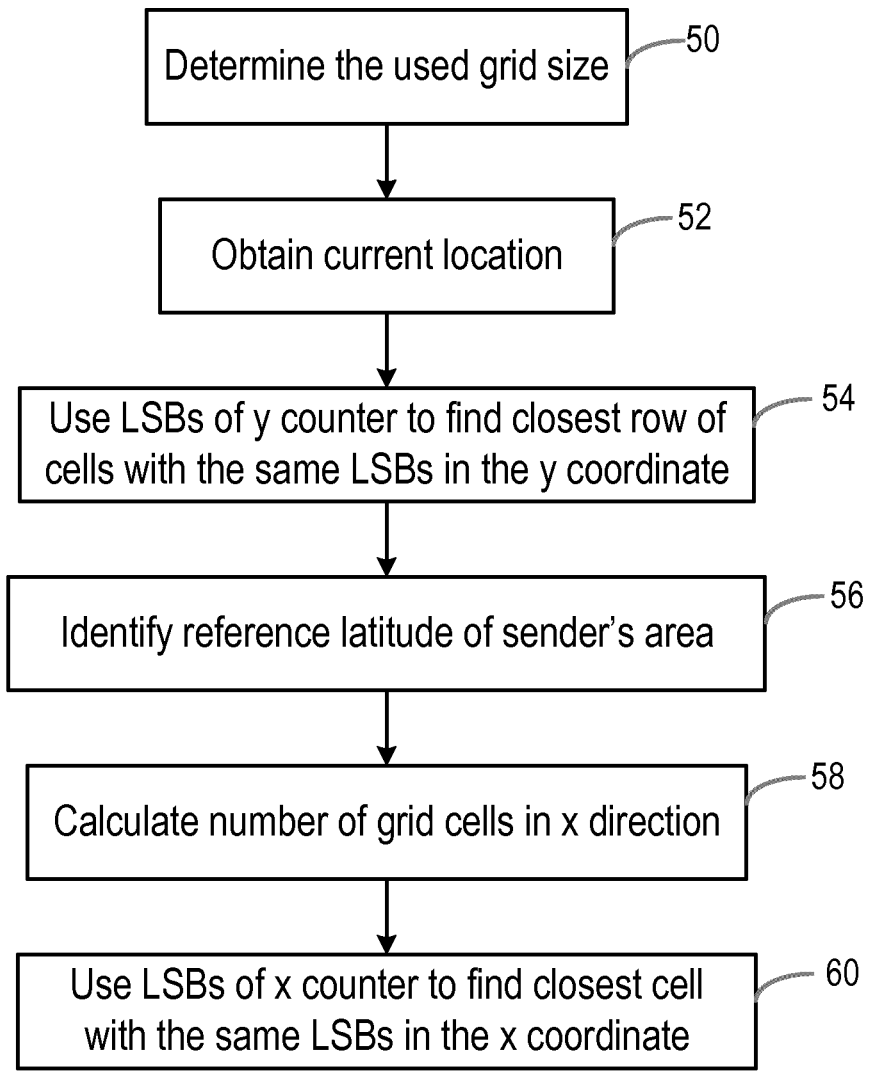
FIG. 4 is a flow chart illustrating a second method.

FIG. 4 is a flow chart, illustrating the steps taken by the receiver.

At step 50, the receiver decodes the additional location information byte to identify whether location information is being transmitted and, if so, the used grid size.

At step 52, the receiver obtains its current location from a positioning method that meets the requirements of accuracy and, if possible with the method, confirms that the obtained location source actually provided sufficient accuracy.

At step 54, the receiver uses the LSBs of the received y counter are used to find the row of cells with the same LSBs in the y coordinate that is closest to its own location. Given that the combined inaccuracy of the sender and receiver are under the maximum tolerated value, this row it will contain the sender's cell.

At step 56, this is also used to identify the reference latitude of the sender's area.

At step 58, the reference latitude is then used to calculate the number of grid cells in the x direction as was done by the sender.

At step 60, the receiver then uses the LSBs of the received x counter value to find the closest cell to its own location that has those LSBs in the x coordinate. This then identifies the sender's cell.

For ProSe, assuming that the transmissions have a 500 m range and for example taking into account a worst case accuracy of 25 m for A-GPS on both sides, then 550 m could be the minimal limit for s. Other possible cell sizes could be then obtained by taking multiples of s, i.e. 1100 m, 2200 m, 4400 m, etc.

The width in degrees of the areas could be 3 degrees. In this manner, the variation in the cell sizes within a given area is reasonable compared to the service range up to a latitude of 75 degrees, and the areas beyond that latitude are by far less populated.

Table 3 shows the maximal total inaccuracy $(i_a+i_b)$ up to which the method works depending on the cell size and the number of included LSBs.

TABLE 3

| Number LSBs | Cell size 550 m | Cell size 1100 | Cell size 2200 m |
|---|---|---|---|
| 2 | — | 25 | 300 |
| 4 | 163 | 575 | 1400 |
| 6 | 713 | 1675 | 3600 |
| 8 | 1813 | 3875 | 8000 |
| 10 | 4013 | 8275 | 16800 |
| 12 | 8413 | 17075 | 34400 |
| 14 | 17213 | 34675 | 69600 |

Table 4 shows the number of cells along the x-axis depending on the cell size where it was assumed that the earth circumference at the equator is 40075 km.

TABLE 4

| Reference Latitude | Grid cells (size 2.2 km) | Grid cells (size 1.1 km) | Grid cells (size 0.55 km) |
|---|---|---|---|
| 3° | 18190 | 36380 | 72760 |
| 6° | 18116 | 36232 | 72464 |
| 9° | 17991 | 35982 | 71964 |
| 12° | 17817 | 35634 | 71268 |
| 15° | 17595 | 35190 | 70380 |
| 18° | 17324 | 34648 | 69296 |
| 21° | 17006 | 34012 | 68024 |
| 24° | 16641 | 33282 | 66564 |
| 27° | 16230 | 32460 | 64920 |
| 30° | 15775 | 31550 | 63100 |
| 33° | 15277 | 30554 | 61108 |
| 36° | 14736 | 29472 | 58944 |
| 39° | 14156 | 28312 | 56624 |
| 42° | 13537 | 27074 | 54148 |
| 45° | 12880 | 25760 | 51520 |
| 48° | 12188 | 24376 | 48752 |
| 51° | 11463 | 22926 | 45852 |
| 54° | 10707 | 21414 | 42828 |
| 57° | 9921 | 19842 | 39684 |
| 60° | 9107 | 18214 | 36428 |
| 63° | 8269 | 16538 | 33076 |
| 66° | 7409 | 14818 | 29636 |
| 69° | 6527 | 13054 | 26108 |
| 72° | 5629 | 11258 | 22516 |
| 75° | 4714 | 9428 | 18856 |
| 78° | 3787 | 7574 | 15148 |
| 81° | 2849 | 5698 | 11396 |
| 84° | 1904 | 3808 | 7616 |
| 87° | 953 | 1906 | 3812 |
| 90° | ?? | ?? | ?? |

Thus, one byte of information could be included in the discovery message where either the sender chooses the cell size, or it is chosen by the ProSe function during the discovery request on application basis. It could be as well fixed in advance and in such case no indication at all is needed in the message.

The additional information can then be protected by a Message Integrity Code and serve as protection against the spatial replay problem. Alternatively, or additionally, the actual counter values could be used in the calculation of the Message Integrity Code and this would also provide protection against spatial replay attacks.

Thus, the location information is based on a coordinate grid where different cell sizes could be supported in order to adapt to the accuracy of the available positioning system. The grid is divided into areas of fixed latitude width such that, within each area, and for a fixed minimal cell size, the variation of the geographical area covered by the cells is tolerated with respect to a certain parameter of the service parameter (e.g. the transmission range). Within each area the cells are numbered uniquely along the latitude lines by an x-counter and the longitude line by a y-counter. In order to transmit its location information, the sender uses a positioning method with a certain accuracy, decides on a cell size (among a fixed number of available fixed sizes), determines the x and y counter of the cell where he is located and includes in the message an indication of the chosen cell size and equal numbers of LSBs for each of the counters.

The solution addresses several limitations of existing methods. It is flexible enough to support several positioning methods with different accuracy levels. The solution induces a processing overhead of few clock cycles, and does not require considerable amount of additional data for transmission. For example, in a service such as ProSe, the solution could be implemented using only one additional byte (8 bits) per discovery message thus limiting spectrum usage.

Figure 5:
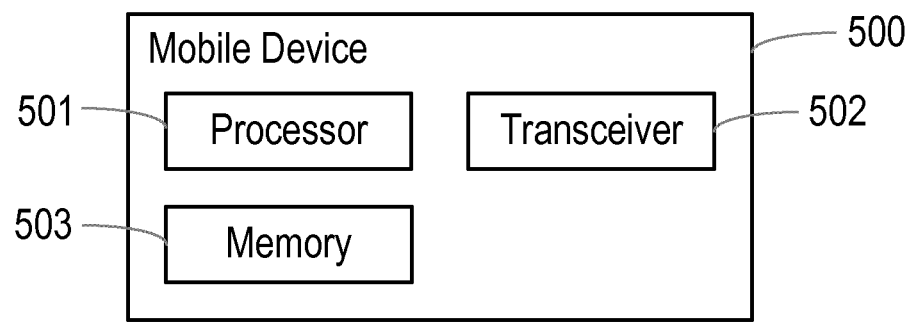
FIG. 5 is a block diagram showing one form of a mobile device for use in the methods described herein.

FIG. 5 shows a mobile device 500 that can be adapted or configured to operate according to one or more of the non-limiting example embodiments described. The mobile device 500 comprises a processor or processing unit 501 that controls the operation of the mobile device 500. The processing unit 501 is connected to a transceiver unit 502 (which comprises a receiver and a transmitter) with associated antenna(s) and is used to transmit signals to and receive signals from nodes in the network. The mobile device 500 also comprises a memory or memory unit 503 that is connected to the processing unit 501 and that contains instructions or computer code executable by the processing unit 501 and other information or data required for the operation of the mobile device 500 in accordance with the methods described herein.

Figure 6:
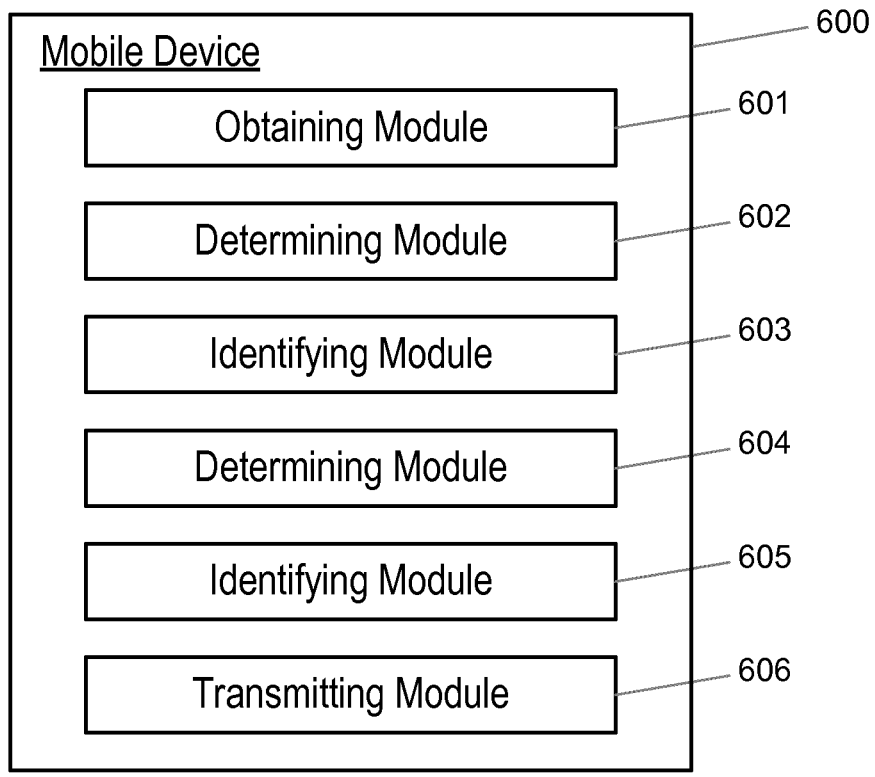
FIG. 6 is a block diagram showing one form of a mobile device for use in the methods described herein.
Figure 7:
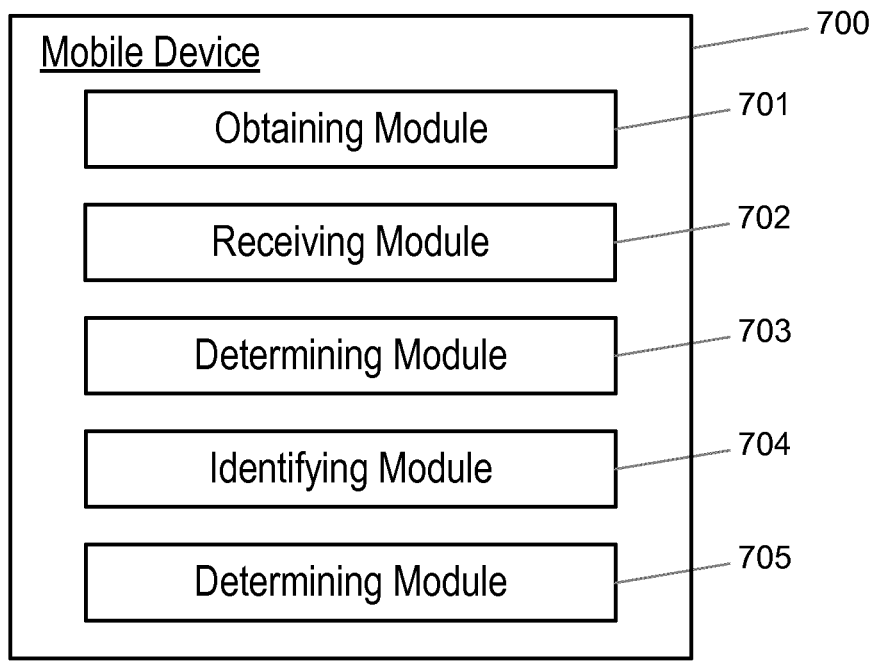
FIG. 7 is a block diagram showing one form of a mobile device for use in the methods described herein.

FIGS. 6 and 7 illustrate functional units in other embodiments of mobile devices 600 and 700, which may execute any of the methods described herein, for example according to computer readable instructions received from a computer program. It will be understood that the modules illustrated in FIGS. 6 and 7 are software implemented functional units, and may be realised in any appropriate combination of software modules.

Referring to FIG. 6, the mobile device 600 comprises: an obtaining module 601 for obtaining information relating to a location of the mobile device; a determining module 602 for determining a minimum cell size to be used; an identifying module 603 for, based on the determined minimum cell size, identifying a grid of cells; a determining module 604 for, based on the obtained information relating to the location of the mobile device, determining a cell of said grid in which the mobile device is located; an identifying module 605 for identifying the cell of said grid in which the mobile device is located by means of respective counter values in each of two orthogonal directions; and a transmitting module 606 for transmitting location information, wherein the location information comprises a plurality of the least significant bits of each of said counter values.

Referring to FIG. 7, the mobile device 700 comprises: an obtaining module 701 for obtaining information relating to a location of the mobile device; a receiving module 702 for receiving transmitted location information relating to a location of another device, wherein the location information comprises a plurality of the least significant bits of respective counter values in each of two orthogonal directions; a determining module 703 for determining a minimum cell size used by the other device; an identifying module 704 for, based on the determined minimum cell size, identifying a grid of cells; and a determining module 705 for based on the received location information relating to the location of the other device, determining a cell of said grid in which the other mobile device is located.

Figure 8:
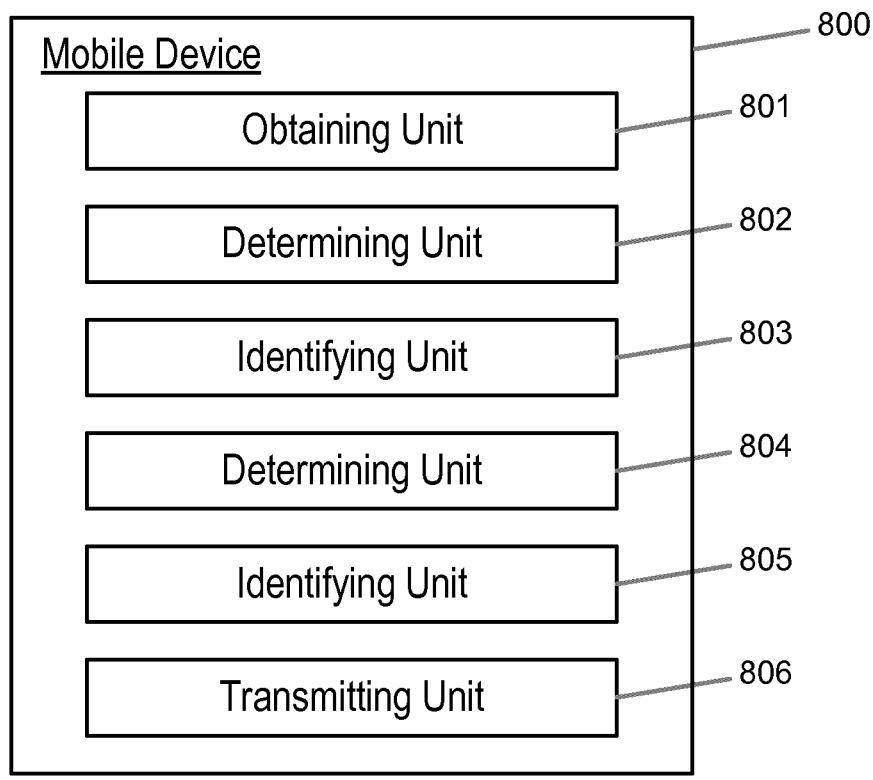
FIG. 8 is a block diagram showing one form of a mobile device for use in the methods described herein.
Figure 9:
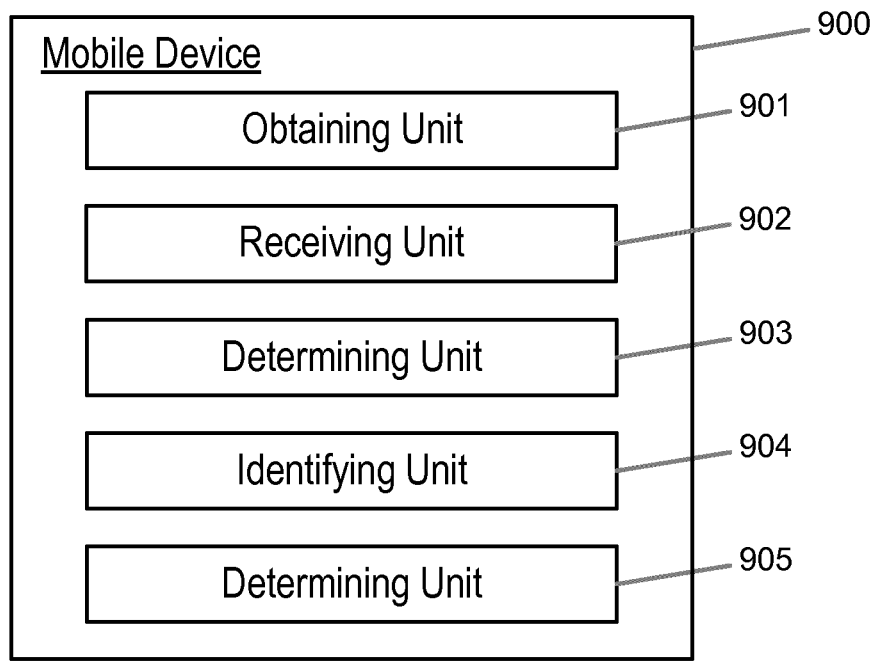
FIG. 9 is a block diagram showing one form of a mobile device for use in the methods described herein.

FIGS. 8 and 9 illustrate functional units in other embodiments of devices or nodes 800 and 900, which may execute any of the methods described herein, for example according to computer readable instructions received from a computer program. It will be understood that the units illustrated in FIGS. 8 and 9 are hardware implemented functional units, and may be realised in any appropriate combination of hardware units.

Referring to FIG. 8, the mobile device 800 comprises: an obtaining unit 801 for obtaining information relating to a location of the mobile device; a determining unit 802 for determining a minimum cell size to be used; an identifying unit 803 for, based on the determined minimum cell size, identifying a grid of cells; a determining unit 804 for, based on the obtained information relating to the location of the mobile device, determining a cell of said grid in which the mobile device is located; an identifying unit 805 for identifying the cell of said grid in which the mobile device is located by means of respective counter values in each of two orthogonal directions; and a transmitting unit 806 for transmitting location information, wherein the location information comprises a plurality of the least significant bits of each of said counter values.

Referring to FIG. 9, the mobile device 900 comprises: an obtaining unit 901 for obtaining information relating to a location of the mobile device; a receiving unit 902 for receiving transmitted location information relating to a location of another device, wherein the location information comprises a plurality of the least significant bits of respective counter values in each of two orthogonal directions; a determining unit 903 for determining a minimum cell size used by the other device; an identifying unit 904 for, based on the determined minimum cell size, identifying a grid of cells; and a determining unit 905 for based on the received location information relating to the location of the other device, determining a cell of said grid in which the other mobile device is located.

There are thus described methods of operation of a terminal device and a network node that allow for improved security.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operation of a mobile device, the method comprising:
   obtaining information relating to a location of the mobile device;
   determining a minimum cell size to be used;
   based on the determined minimum cell size, identifying a grid of cells;
   based on the obtained information relating to the location of the mobile device, determining a cell of the grid in which the mobile device is located;
   identifying the cell of the grid in which the mobile device is located by means of respective counter values in each of two orthogonal directions; and
   transmitting location information, wherein the location information comprises a plurality of the least significant bits of each of the counter values.

2. The method of claim 1, wherein the location information further comprises information identifying the determined minimum cell size or information identifying a determined one of a plurality of predetermined minimum cell sizes.

3. The method of claim 1, further comprising determining a minimum cell size to be used based on information regarding an accuracy of the obtained information relating to the location of the mobile device.

4. The method of claim 1, further comprising determining a minimum cell size to be used based on information regarding an assumed accuracy of location information available to a device receiving the transmitted location information.

5. The method of claim 1, further comprising determining a minimum cell size to be used based on an assumed range of the transmission of location information.

6. The method of claim 1, wherein the grid is formed by dividing the circumference of the earth, at each of a plurality of latitudes, into a number of cells having the determined minimum cell size.

7. The method of claim 6:
wherein the grid is formed by dividing the earth into a plurality of latitude bands, and, in each of the bands, dividing the circumference of the earth at a respective latitude within the band into a number of cells;
wherein the number of cells is obtained by dividing the circumference of the earth at a representative latitude within the band by the determined minimum cell size.

8. The method of claim 7, wherein the representative latitude within each band is a highest absolute value of latitude within the band.

9. The method of claim 1, wherein the location information comprises equal numbers of the least significant bits of each of the counter values.

10. The method of claim 1:
wherein the two orthogonal directions comprise latitudinal and longitudinal directions;
wherein the counter values in a latitudinal direction start from zero at a latitude of 90° south; and
wherein the counter values in a longitudinal direction start from zero at 180° west.

11. A mobile device comprising:
processing circuitry;
memory containing instructions executable by the processing circuitry whereby the mobile device is operative to:
obtain information relating to a location of the mobile device;
determine a minimum cell size to be used;
based on the determined minimum cell size, identify a grid of cells;
based on the obtained information relating to the location of the mobile device, determine a cell of the grid in which the mobile device is located;
identify the cell of the grid in which the mobile device is located by means of respective counter values in each of two orthogonal directions; and
transmit location information, wherein the location information comprises a plurality of the least significant bits of each of the counter values.

12. A method of operation of a mobile device, the method comprising:
obtaining information relating to a location of the mobile device;
receiving transmitted location information relating to a location of another device, wherein the location information comprises a plurality of the least significant bits of respective counter values in each of two orthogonal directions;
determining a minimum cell size used by the other device;
based on the determined minimum cell size, identifying a grid of cells; and
based on the received location information relating to the location of the other device, determining a cell of the grid in which the other mobile device is located.

13. The method of claim 12, wherein the received location information further comprises information identifying the determined minimum cell size or information identifying a determined one of a plurality of predetermined minimum cell sizes.

14. The method of claim 12:
wherein the grid is formed by dividing the earth into a plurality of latitude bands, and, in each of the bands, dividing the circumference of the earth at a respective latitude within the band into a number of cells having the determined minimum cell size;
wherein the method comprises:
based on the information relating to the location of the mobile device, identifying the latitude band in which the device is located; and
determining the number of cells having the determined minimum cell size around the circumference of the earth in the identified latitude band.

15. The method of claim 14, further comprising, based on the information relating to the location of the mobile device, using the received location information to identify a cell in which the other device is located.

16. A mobile device, comprising:
processing circuitry;
memory containing instructions executable by the processing circuitry whereby the mobile device is operative to:
obtain information relating to a location of the mobile device;
receive transmitted location information relating to a location of another device, wherein the location information comprises a plurality of the least significant bits of respective counter values in each of two orthogonal directions;
determine a minimum cell size used by the other device;
based on the determined minimum cell size, identify a grid of cells; and
based on the received location information relating to the location of the other device, determine a cell of the grid in which the other mobile device is located.

* * * * *